US008118706B2

(12) United States Patent
Coutant et al.

(10) Patent No.: US 8,118,706 B2
(45) Date of Patent: Feb. 21, 2012

(54) MACHINE HAVING A MULTIPLE-RATIO TRANSMISSION

(75) Inventors: Alan R. Coutant, Dunlap, IL (US); Michael G. Cronin, Peoria, IL (US); Steven A. Daniel, East Peoria, IL (US); Norval P. Thomson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 868 days.

(21) Appl. No.: 12/216,111

(22) Filed: Jun. 30, 2008

(65) Prior Publication Data

US 2009/0325762 A1 Dec. 31, 2009

(51) Int. Cl.
*B60W 10/04* (2006.01)
*B60W 10/10* (2006.01)
*G06F 7/00* (2006.01)
*G06F 17/00* (2006.01)

(52) U.S. Cl. ............... 477/107; 477/115; 701/54
(58) Field of Classification Search .......... 477/107, 477/115; 701/54
See application file for complete search history.

(56) References Cited

U.S. PATENT DOCUMENTS

| | | | |
|---|---|---|---|
| 5,048,638 A | 9/1991 | Duncan et al. | |
| 5,344,370 A | 9/1994 | Luyckx | |
| 5,406,483 A | 4/1995 | Kallis et al. | |
| 5,526,261 A | 6/1996 | Kallis et al. | |
| 6,203,463 B1 | 3/2001 | Casey et al. | |
| 6,260,440 B1 | 7/2001 | Cronin et al. | |
| 6,371,882 B1 | 4/2002 | Casey et al. | |
| 6,424,902 B1 | 7/2002 | Kuras | |
| 6,457,382 B2 | 10/2002 | Cronin et al. | |
| 6,616,559 B1 | 9/2003 | Hori et al. | |
| 6,703,463 B2 | 3/2004 | Holguin et al. | |
| 7,192,374 B2 | 3/2007 | Kuras et al. | |
| 7,210,293 B2 | 5/2007 | Fukasawa et al. | |
| 7,217,216 B2 | 5/2007 | Inoue | |
| 7,247,122 B2 | 7/2007 | Shah | |

(Continued)

FOREIGN PATENT DOCUMENTS

JP 63266264 A 11/1988

(Continued)

OTHER PUBLICATIONS

U.S. Appl. No. 11/711,760, filed Feb. 28, 2007, "Machine System Having Task-Adjusted Economy Modes," pp. 1-18, Figs. 1-3.

(Continued)

*Primary Examiner* — Tisha Lewis
(74) *Attorney, Agent, or Firm* — Finnegan, Henderson, Farabow, Garrett & Dunner LLP

(57) ABSTRACT

The machine may have a power system that includes a prime mover, a multiple-ratio transmission, a propulsion device, and power-system controls. The method may include propelling the machine by transmitting power from the prime mover to the propulsion device through the multiple-ratio transmission, while controlling operation of the prime mover and the multiple-ratio transmission with the power-system controls. This may include determining with the power-system controls at least one energy-efficiency estimate based at least on energy-efficiency characteristics of the prime mover and energy-efficiency characteristics of the multiple-ratio transmission. Controlling the prime mover and the multiple-ratio transmission may further include controlling a prime-mover operating speed of the prime mover and a transmission drive ratio of the multiple-ratio transmission based at least in-part on the at least one energy-efficiency estimate.

17 Claims, 3 Drawing Sheets

U.S. PATENT DOCUMENTS

| | | |
|---|---|---|
| 7,256,510 B2 | 8/2007 | Holmes et al. |
| 7,264,570 B2 | 9/2007 | Heap et al. |
| 2002/0173403 A1 | 11/2002 | Kohno et al. |
| 2004/0014557 A1 | 1/2004 | Carlson et al. |
| 2004/0054458 A1 | 3/2004 | Reuschel et al. |
| 2004/0254047 A1 | 12/2004 | Frank et al. |
| 2005/0043138 A1 | 2/2005 | Fuller |
| 2005/0049108 A1 | 3/2005 | Nishizawa et al. |
| 2005/0227809 A1 | 10/2005 | Bitzer et al. |
| 2005/0277501 A1 | 12/2005 | Kuras et al. |
| 2006/0112688 A1 | 6/2006 | Vos et al. |
| 2006/0166784 A1 | 7/2006 | Tabata et al. |
| 2006/0234822 A1 | 10/2006 | Morscheck et al. |
| 2007/0004552 A1 | 1/2007 | Matsudaira et al. |
| 2007/0142167 A1 | 6/2007 | Kanafani et al. |
| 2007/0254771 A1* | 11/2007 | Funke et al. ............... 477/68 |
| 2009/0105041 A1* | 4/2009 | McKenzie et al. ........... 477/41 |

FOREIGN PATENT DOCUMENTS

| | | |
|---|---|---|
| JP | 63266266 A | 11/1988 |

OTHER PUBLICATIONS

U.S. Appl. No. 11/882,234, filed Jul. 31, 2007, "Machine with Task-Dependent Control," pp. 1-17, Figs. 1-6.

U.S. Appl. No. 11/905,309, filed Sep. 28, 2007, "CVT Control System Having Variable Power Source Speed," pp. 1-15, Figs. 1-3.

* cited by examiner

MACHINE HAVING A MULTIPLE-RATIO TRANSMISSION

TECHNICAL FIELD

The present disclosure relates to machines and, more particularly, to machines having multiple-ratio transmissions.

BACKGROUND

Many machines include a power system operable to propel the machine by transmitting power from a prime mover (such as an engine or electric motor) to propulsion devices (such as wheels or tracks) through a multiple-ratio transmission. Such a multiple-ratio transmission can transmit power at any of a number of transmission drive ratios, or speed ratios between the input and the output of the multiple-ratio transmission. As a result, there often exist multiple alternative combinations of prime-mover operating speed and transmission drive ratio that could be used to propel the machine at any particular speed. The prime-mover operating speed and transmission drive ratio used to propel the machine at any given speed may affect various aspects of the performance of the machine, including the energy efficiency of the power system.

U.S. Patent Application Publication No. 2004/0254047 to Frank et al. ("the '047 application") discloses controlling an engine and an associated continuously variable transmission in a manner to maintain operation of the engine constantly on a speed/power curve where the engine has its maximum energy efficiency. The control system disclosed in the '047 application determines either a power requirement or a torque requirement based on operator input received via an accelerator pedal. In response to changes in the determined power or torque requirement, the control system adjusts the engine operating speed and torque, as well as the transmission drive ratio, while maintaining operation of the engine constantly on the speed/power curve where it has its maximum energy efficiency.

Although the control method of the '047 application discloses controlling its engine and continuously variable transmission to maintain the engine on the speed/power curve where the engine has its maximum energy efficiency, certain disadvantages persist. For example, in some applications and/or circumstances, other considerations may make it undesirable to constrain operation of the engine exclusively to the speed/power curve where it has its highest energy efficiency. Some circumstances may warrant operating the engine and continuously variable transmission at a different operating point in order to enhance the ability to effectively respond to any increase in power demands that may occur.

SUMMARY OF THE INVENTION

One disclosed embodiment relates to a method of operating a machine. The machine may have a power system that includes a prime mover, a multiple-ratio transmission, a propulsion device, and power-system controls. The method may include propelling the machine by transmitting power from the prime mover to the propulsion device through the multiple-ratio transmission, while controlling operation of the prime mover and the multiple-ratio transmission with the power-system controls. This may include determining with the power-system controls at least one energy-efficiency estimate based at least in part on energy-efficiency characteristics of the prime mover and energy-efficiency characteristics of the multiple-ratio transmission. Controlling the prime mover and the multiple-ratio transmission may further include controlling a prime-mover operating speed of the prime mover and a transmission drive ratio of the multiple-ratio transmission based at least in part on the at least one energy-efficiency estimate.

Another embodiment relates to a machine having a power system. The power system may include a prime mover, a propulsion device, and a multiple-ratio transmission. Additionally, the power system may include power-system controls that selectively operate the power system to propel the machine by transmitting power from the prime mover to the propulsion device through the multiple-ratio transmission. In doing so, the power-system controls may determine a first target for a prime-mover operating speed of the prime mover and a transmission drive ratio of the multiple-ratio transmission. The first target may be associated with promoting energy efficiency. The power-system controls may also determine a second target for the prime-mover operating speed and the transmission drive ratio, which second target may be associated with promoting responsiveness of the power system to increased power demands. The power-system controls may control the prime-mover operating speed and the transmission drive ratio based at least in part on both the first target and the second target.

A further disclosed embodiment relates to a machine having a power system. The power system may include a prime mover, a propulsion device, and a multiple-ratio transmission. The power system may also include power-system controls that selectively operate the power system to propel the machine by transmitting power from the prime mover to the propulsion device through the multiple-ratio transmission. In doing so, the power-system controls may determine a first target for a combination of a prime-mover operating speed of the prime mover and a transmission drive ratio of the multiple-ratio transmission. Determining the first target may include determining multiple combined energy-efficiency estimates for a plurality of components of the power system at multiple alternative combinations of the prime-mover operating speed and the transmission drive ratio, and selecting the first target based at least in part on the multiple combined efficiency estimates. The power-system controls may also determine a second target for the combination of the prime-mover operating speed and the transmission drive ratio, which second target may be associated with promoting responsiveness of the power system to increased power demands. The power-system controls may control the prime-mover operating speed and the transmission drive ratio based at least in part on both the first target and the second target.

DETAILED DESCRIPTION

Figure 1:
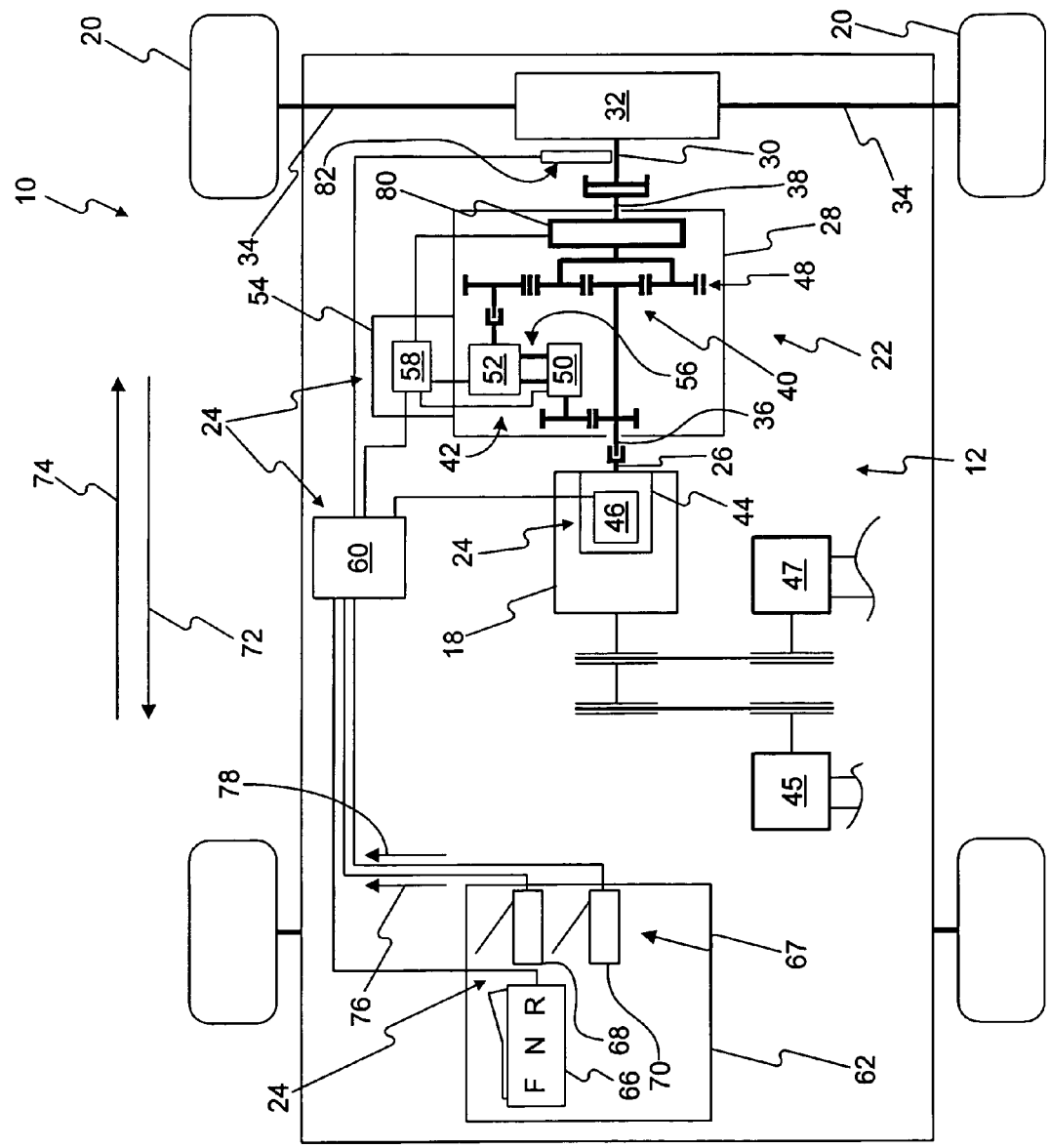
FIG. 1 is a diagrammatic illustration of a machine having one embodiment of a power system according to the present disclosure.

FIG. 1 illustrates a machine 10 having one embodiment of a power system 12 according to the present disclosure. Power system 12 may include a prime mover 18, propulsion devices 20, a drive train 22, and power-system controls 24.

Prime mover 18 may be any type of component operable to provide mechanical power for other components of power system 12. For example, prime mover 18 may be a diesel engine, a gasoline engine, a gaseous-fuel-driven engine, or a turbine engine. Prime mover 18 may have a rotary-output member 26 for supplying rotary mechanical power. Prime mover 18 may also include prime-mover controls 44. Prime-mover controls 44 may include any component or components operable to control one or more aspects of the operation of prime mover 18. In some embodiments, prime-mover controls 44 may include a prime-mover controller 46 operatively connected to various sensors and/or actuators (not shown) for monitoring and controlling prime mover 18. Prime-mover controller 46 may include one or more processors (not shown) and one or more memory devices (not shown).

Propulsion devices 20 may include any type of components operable to propel machine 10 by receiving power from one or more other components of power system 12 and applying that power to the environment surrounding machine 10. For example, as shown in FIG. 1, propulsion devices 20 may include wheels. Propulsion devices 20 may also include various other types of devices in addition to, or in place of, wheels, including, but not limited to, track units and/or propellers.

Drive train 22 may include any component or components operable to transfer power from prime mover 18 to propulsion devices 20 to propel machine 10. For example, drive train 22 may include a multiple-ratio transmission 28, a drive shaft 30, a differential unit 32, and axle shafts 34 connected between prime mover 18 and propulsion devices 20. Multiple-ratio transmission 28 may have a rotary-input member 36 and a rotary-output member 38. Rotary-input member 36 may connect directly or indirectly to rotary-output member 26 of prime mover 18. Drive shaft 30, differential unit 32, and axle shafts 34 may connect rotary-output member 38 to propulsion devices 20.

Multiple-ratio transmission 28 may have any configuration that allows transferring power between rotary-input member 36 and rotary-output member 38 at any of a plurality of transmission drive ratios. In some embodiments, multiple-ratio transmission 28 may be a continuously variable transmission, meaning that multiple-ratio transmission 28 may have a configuration that allows transferring power between rotary-input member 36 and rotary-output member 36 while varying the transmission drive ratio through a continuous range. FIG. 1 illustrates one such embodiment of multiple-ratio transmission 28. In this embodiment, multiple-ratio transmission 28 has a mechanical power-transfer path 40 and a hydraulic power-transfer path 42 connected in parallel between rotary-input member 36 and rotary-output member 38. Mechanical power-transfer path 40 may include a planetary gear set 48 connected between rotary-input member 36 and rotary-output member 38. Rotary-input member 36 may, for example, connect directly or indirectly to the sun gear of planetary gear set 48, and the planet carrier of planetary gear set 48 may connect directly or indirectly to rotary-output member 38.

Hydraulic power-transfer path 42 may include a hydraulic pump 50, a hydraulic motor 52, and a fluid-transfer system 56 for delivering hydraulic fluid pumped by hydraulic pump 50 to hydraulic motor 52. Fluid-transfer system 56 may include various conduits, valves, reservoirs, and/or other known hydraulics components. Hydraulic pump 50 may connect to rotary-input member 36. Hydraulic motor 52 may, for example, connect to the ring gear of planetary gear set 48. This connection of rotary-input member 36, hydraulic motor 52, and rotary-output member 38 to planetary gear set 48 makes the speed of rotary-input member 36, the speed of hydraulic motor 52, and the speed of rotary-output member 38 interdependent.

Multiple-ratio transmission 28 may also include a reverser mechanism 80 connected between planetary gear set 48 and rotary-output member 38. Reverser mechanism 80 may have one operating state that results in rotary-output member 38 rotating in the same direction as rotary-input member 36, and reverser mechanism 80 may have another operating state that results in rotary-output member 38 rotating in a direction opposite rotary-input member 36. Thus, one operating state of reverser mechanism 80 may allow propulsion of machine 10 in a forward direction 72, and another operating state of reverser mechanism 80 may allow propulsion of machine 10 in a reverse direction 74. Reverser mechanism 80 may have various combinations of power-transfer components, including, but not limited to, gears, pulleys, sprockets, chains, and/or clutches arranged in various manners.

Multiple-ratio transmission 28 may also include transmission controls 54. Transmission controls 54 may include any component or components operable to control one or more parameters of the operation of multiple-ratio transmission 28. Transmission controls 54 may, for example, include a transmission controller 58 operatively connected to various components of multiple-ratio transmission 28. Transmission controller 58 may include one or more processors (not shown) and one or more memory devices (not shown). Transmission controller 58 may be operatively connected to one or more components of hydraulic power-transfer path 42 in a manner enabling transmission controller 58 to control the speed and power output of hydraulic motor 52. Transmission controller 58 may, for example, be operatively connected to hydraulic pump 50 and hydraulic motor 52 in a manner enabling transmission controller 58 to control the displacement of hydraulic pump 50 and the displacement of hydraulic motor 52. By controlling the operating speed and power output of hydraulic motor 52, transmission controller 58 may control the ratio of the speed of rotary-input member 36 to the speed of rotary-output member 38, as well as the speed and torque output of rotary-output member 38. Transmission controller 58 may also be operatively connected to reverser mechanism 80, such that transmission controller 58 may control whether rotary-output member 38 rotates in the same direction as, or opposite to, rotary-input member 36.

Multiple-ratio transmission is not limited to the configuration shown in FIG. 1. For example, multiple-ratio transmission 28 may include components not shown in FIG. 1, and/or multiple-ratio transmission 28 may omit one or more of the components shown in FIG. 1. In some embodiments, multiple-ratio transmission 28 may include provisions for discrete changes in the drive ratio within various portions of mechanical power-transfer path 40 and/or in other portions of multiple-ratio transmission 28. Additionally, in some embodiments, in place of hydraulic power-transfer path 42, multiple-ratio transmission 28 may have an electrical power-transfer path parallel with mechanical power-transfer path 40. Such an embodiment of multiple-ratio transmission 28 may include an electric generator, an electric motor, and an electrical power-transfer circuit in place of hydraulic pump 50, hydraulic motor 52, and fluid-transfer system 56, respectively.

Additionally, in some embodiments, multiple-ratio transmission 28 may not have parallel power-transfer paths. For example, multiple-ratio transmission 28 may have a single mechanical power-transfer path. Alternatively, multiple-ratio transmission 28 may be a conventional hydrostatic transmission. Similarly, multiple-ratio transmission 28 may include only an electrical power-transfer path that includes an electric generator connected directly or indirectly to rotary-input member 36 and an electric motor connected directly or indirectly to rotary-output member 38. Furthermore, in some embodiments, multiple-ratio transmission 28 may be a step-change multiple-ratio transmission, rather than a continuously variable multiple-ratio transmission.

In addition to prime mover 18, propulsion devices 20, and drive train 22, power system 12 may include various other components that produce, transfer, and/or convert power for various purposes. For example, power system 12 may include a hydraulic pump 45 and an electric generator 47, each driven by prime mover 18. Hydraulic pump 45 may be, for example, a variable-displacement pump. Hydraulic pump 45 may supply hydraulic fluid to various devices of machine 10, such as actuators for a steering system (not shown) and/or actuators for various implements (not shown) like hoists and excavating tools. Electric generator 47 may be any type of device operable to receive mechanical power from prime mover 18 and convert at least a portion of that energy into electricity. Electric generator 47 may supply electricity to various types of electrical components of machine 10, including, but not limited to, electric motors (not shown), lights (not shown), heaters (not shown), sensors (not shown), and controllers (not shown).

Power-system controls 24 may include prime-mover controls 44, transmission controls 54, a master controller 60, and one or more operator-input devices of an operator interface 62 of machine 10. Master controller 60 may include one or more processors (not shown) and one or more memory devices (not shown). Master controller 60 may receive information from various sources.

In some embodiments, master controller 60 may receive input from the operator-input devices of operator interface 62. These operator-input devices may include, for example, a FORWARD/NEUTRAL/REVERSE selector 66 and throttling controls 67. An operator of machine 10 may select the "FORWARD" operating state of FORWARD/NEUTRAL/REVERSE selector 66 to request propulsion of machine 10 in forward direction 72. Conversely, the operator may select the "REVERSE" operating state of FORWARD/NEUTRAL/REVERSE selector 66 to request propulsion of machine 10 in reverse direction 74. Alternatively, the operator may select the "NEUTRAL" operating state of FORWARD/NEUTRAL/REVERSE selector 66 to request that power system 12 not propel machine 10 in either forward direction 72 or reverse direction 74.

Throttling controls 67 may include any component or components with which the operator may request acceleration or deceleration of machine 10 in the selected direction of travel. For example, throttling controls 67 may include an accelerator pedal 68 and a decelerator pedal 70. With the FORWARD/NEUTRAL/REVERSE selector 66 in its FORWARD or REVERSE operating state, the operator may use the accelerator pedal 68 and decelerator pedal 70, separately or in combination, to indicate how rapidly he desires power system 12 to propel machine 10 in the chosen direction. Accelerator pedal 68 and decelerator pedal 70 may each generate a throttling input signal indicating how far the operator has depressed the pedal. Specifically, accelerator pedal 68 may generate an accelerator throttling signal 76 indicating how far the operator has depressed accelerator pedal 68 from its default position, and decelerator pedal 70 may generate a decelerator throttling signal 78 indicating how far the operator has depressed decelerator pedal 70 from its default position.

Generally, master controller 60 may interpret an accelerator throttling signal 76 indicating increased depression of accelerator pedal 68 as a request for increased speed in the chosen direction and a decelerator throttling signal 78 indicating increased depression of decelerator pedal 70 as a request for decreased speed in the chosen direction. In some embodiments, master controller 60 may consider accelerator throttling signal 76 and decelerator throttling signal 78 collectively as the indication of the propulsion speed desired by the operator. In such embodiments, master controller 60 may consider any depression of decelerator pedal 70 as at least partially offsetting any depression of accelerator pedal 68 and vice versa, with the relationship between accelerator throttling signal 76 and decelerator throttling signal 78 defining the desired propulsion speed.

In addition to operator-input devices, various other components and/or systems may provide information to master controller 60. For example, a speed/direction sensor 82 may provide master controller 60 a signal indicating the travel speed of machine 10, as well as whether machine 10 is traveling in forward direction 72 or in reverse direction 74. Additionally, master controller 60 may be operatively connected to hydraulic pump 45 and electric generator 47 in a manner allowing master controller 60 to monitor one or more aspects of their operating states. For instance, master controller 60 may monitor and/or control the displacement setting of hydraulic pump 45 and the quantity of electricity generated by electric generator 47. Master controller 60 may also receive signals from various other sensors (not shown), including, but not limited to, other speed/direction sensors, position sensors, pressure sensors, and/or temperature sensors.

Master controller 60 may also be operatively connected to prime-mover controls 44 and transmission controls 54. For example, master controller 60 may be communicatively linked to prime-mover controller 46 of prime-mover controls 44, as well as to transmission controller 58 of transmission controls 54. This may allow master controller 60 to coordinate control of prime mover 18 and multiple-ratio transmission 28 by receiving information from and sending control commands to prime-mover controller 46 and transmission controller 58. Thus, based on operator inputs from operator interface 62 and various other components of machine 10, master controller 60 may control whether and in what direction power system 12 propels machine 10. Additionally, as discussed in greater detail below, master controller 60 may coordinate the operating speed of prime mover 18 and the transmission drive ratio of multiple-ratio transmission 28 to promote energy efficiency and responsiveness of power system 12.

Power system 12 is not limited to the configuration shown in FIG. 1. For example, power system 12 may omit one or both of hydraulic pump 45 and electric generator 47. Similarly, power system 12 may include various other types of components not shown in FIG. 1. Additionally, drive train 22 may also have multiple-ratio transmission 28 connected between rotary-output member 26 of prime mover 18 and propulsion devices 20 differently than shown in FIG. 1. For example, drive train 22 may include various additional components connected between rotary-input member 36 of multiple-ratio transmission 28 and rotary-output member 26 of prime mover 18, including, but not limited to, one or more clutches, fluid couplers, gears, pulleys, belts, sprockets, and chains. Similarly, drive train 22 may have additional power-transfer components connected between rotary-output member 38 of multiple-ratio transmission 28 and propulsion devices 20, and/or drive train 22 may omit one or more of drive shaft 30, differential unit 32, and axle shafts 34.

Additionally, power-system controls 24 may have a different configuration. For example, in combination with, or in place of, FORWARD/NEUTRAL/REVERSE selector 66, accelerator pedal 68, and decelerator pedal 70, power-system controls 24 may include various other operator-input devices with which an operator may indicate one or more aspects of how the operator desires power system 12 to propel machine 10. Rather than accelerator pedal 68 and decelerator pedal 70, throttling controls 67 may include other types of operator-control devices, such as handles. Furthermore, throttling controls 67 may omit decelerator pedal 70, employing only accelerator pedal 68 or a similar operator-control device for indicating desired propulsion speed and/or acceleration. Additionally, power-system controls 24 may omit one or more of prime-mover controller 46, transmission controller 58, and master controller 60. Power-system controls 24 may include various other types of control components, such as hard-wired control circuits, in addition to, or in place of, one or more of prime-mover controller 46, transmission controller 58, and master controller 60.

INDUSTRIAL APPLICABILITY

Power system 12 may have use in any machine 10. In response to inputs from the operator, machine 10 may employ power system 12 to perform various tasks during operation. For example, in response to operator inputs indicating that the operator desires propulsion of machine 10, power system 12 may propel machine 10 by transmitting power from rotary-output member 26 of prime mover 18 to propulsion devices 20 through multiple-ratio transmission 28.

While power system 12 propels machine 10, power-system controls 24 may adjust various aspects of the operation of prime mover 18 and drive train 22 based on operator inputs and other operating conditions. For example, power-system controls 24 may adjust the operating speed of prime mover 18 and the transmission drive ratio of multiple-ratio transmission 28. In many embodiments or circumstances, there may exist multiple alternative combinations of prime-mover operating speed and transmission drive ratio that power system 12 may use to propel machine 10 at a particular travel speed. Various aspects of the performance of machine 10, including the energy efficiency of power system 12 and the responsiveness of power system 12 to increased power demands, may depend in complicated ways on the combination of prime-mover operating speed and transmission drive ratio selected to propel machine 10 at any particular travel speed. As used herein, the responsiveness of power system 12 to increased power demands means the ability of power system 12 to quickly increase the amount of power provided when the power load on power system 12 increases or the operator requests increased speed, acceleration, or increased power consumption by power loads of the power system other than the propulsion system.

Figure 2A:
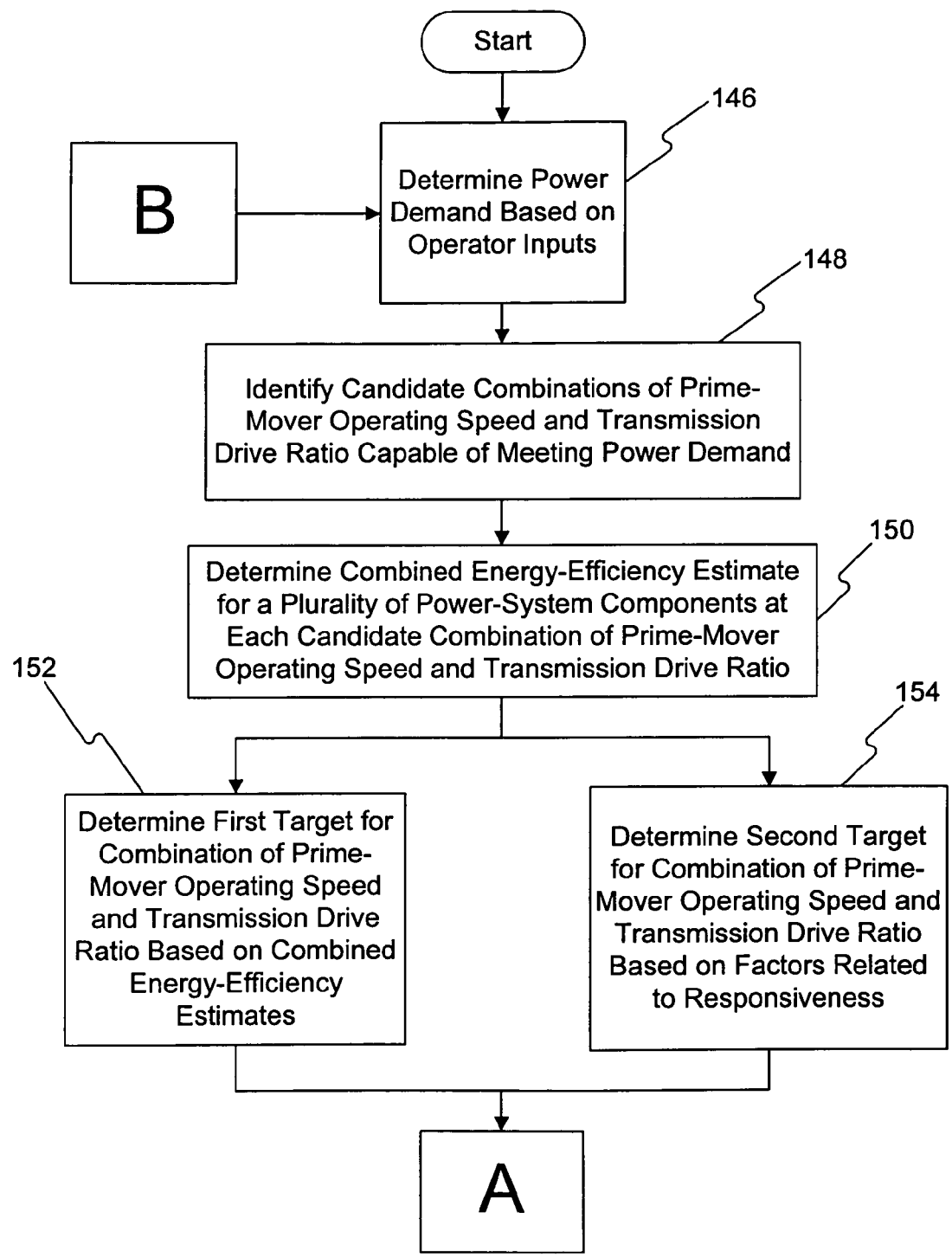
FIG. 2A is a first portion of a flow chart illustrating one embodiment of a control method according to the present disclosure.
Figure 2B:
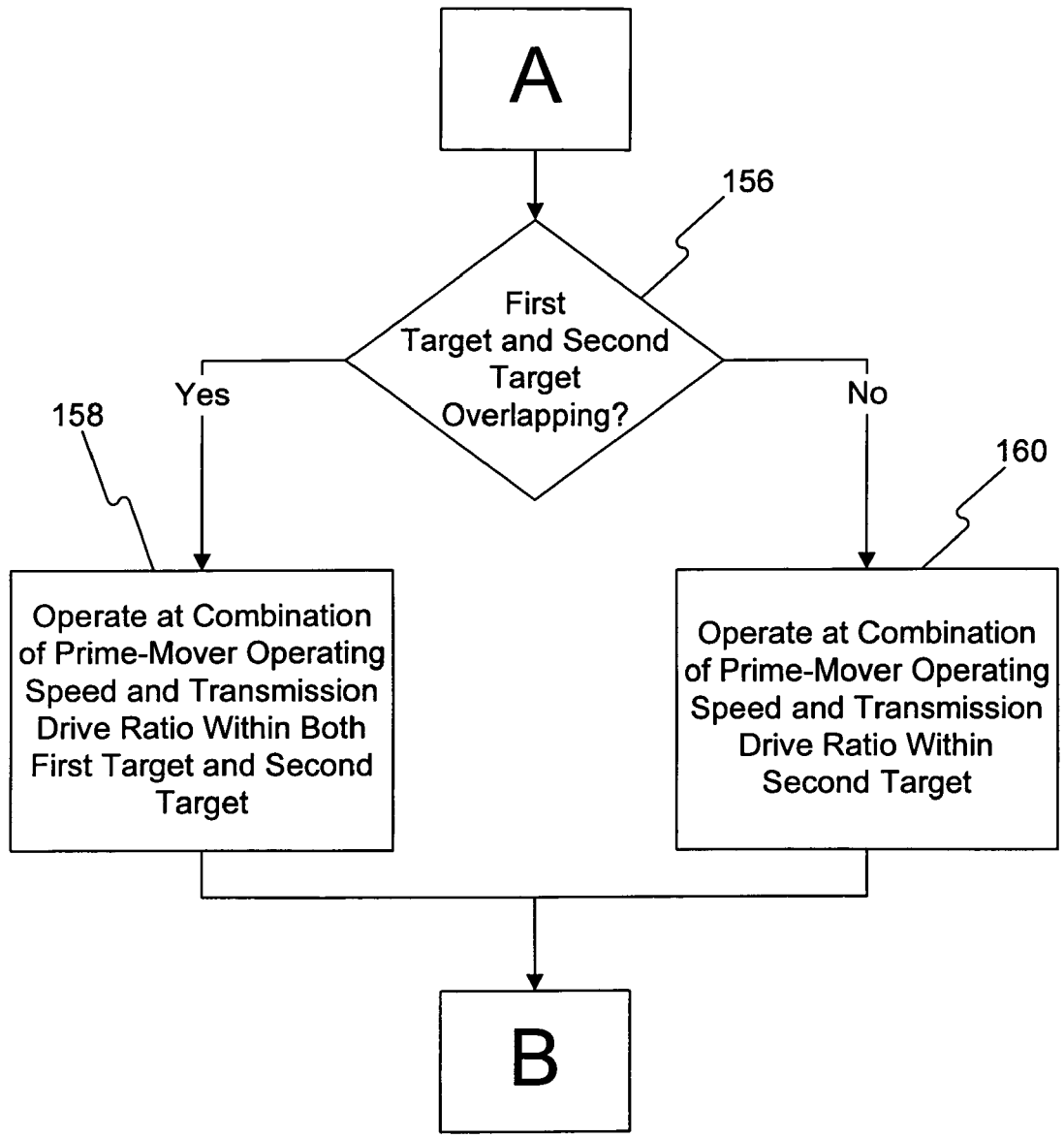
FIG. 2B is a second portion of the flow chart that starts in FIG. 2A.

Because of the complicated effects of prime-mover operating speed and transmission drive ratio on the performance of machine 10, selecting an appropriate combination of prime-mover operating speed and transmission drive ratio to propel machine 10 at a particular travel speed in particular circumstances may prove very complicated. Power-system controls 24 may relieve the operator of the burden of selecting prime-mover operating speed and transmission drive ratio, while providing a favorable combination of energy efficiency and responsiveness of power system 12 to increased power demands. Power-system controls 24 may do so by automatically controlling the prime-mover operating speed and transmission drive ratio based on various operator inputs. As part of this, power-system controls 24 may use operator inputs related to propulsion as an indication of a desired end result, or propulsion demand (e.g., a desired propulsion speed, acceleration, or power level). Additionally, based on operator inputs, power-system controls 24 may determine the amount of power required by various other power loads of machine 10, such as one or more hydraulic pumps (not shown), one or more electric generators (not shown), and/or other power loads of machine 10. Based on the determined amount of power required by such other power loads and the propulsion demands, power-system controls 24 may automatically select a combination of prime-mover operating speed and transmission drive ratio that will meet that propulsion demand and the power requirements of the other power loads of machine 10, while promoting energy efficiency and responsiveness. FIGS. 2A and 2B illustrate one embodiment of a control method that power-system controls 24 may implement to do so.

Referring to FIG. 2A, initially, power-system controls 24 may determine a power demand based on operator inputs (step 146). This may include, for example, calculating a desired quantity of power for propelling machine 10 based on accelerator throttling signal 76 and decelerator throttling signal 78 and other inputs. Additionally, it may include determining a desired quantity of power for operating other power loads of machine 10 based on various operator inputs and other inputs. To determine the total power demand, power-system controls 24 may, for example add the desired quantity of power for propelling machine 10 to the desired quantity of power for other power loads of machine 10. Power-system controls 24 may then determine multiple candidate combinations of prime-mover operating speed and transmission drive ratio at which power system 12 can meet the determined power demand (step 148). For example, power-system controls 24 may identify multiple combinations of prime-mover operating speed and transmission drive ratio where power system 12 can generate at least as much power as the target value.

Subsequently, for each of the candidate combinations of prime-mover operating speed and transmission drive ratio, power-system controls 24 may determine a combined energy-efficiency estimate for a plurality of components of power system 12 (step 150). For example, at each candidate combination of prime-mover operating speed and transmission drive ratio, power-system controls 24 may calculate an estimated combined energy efficiency for prime mover 18, multiple-ratio transmission 28, hydraulic pump 45, and electric generator 47. This may involve determining the individual energy efficiency for each of these components at the candidate combination of prime-mover operating speed and transmission drive ratio, followed by using those individual efficiency values to calculate the combined energy-efficiency estimate for the group. Power-system controls 24 may determine the energy efficiency of prime mover 18 for a particular combination of prime-mover operating speed and transmission drive ratio by using data that relates prime-mover operating speed to energy efficiency of prime mover 18. Power-system controls 24 may also use data about the energy efficiency of multiple-ratio transmission 28 at different transmission drive ratios and prime-mover operating speeds to determine the energy efficiency of multiple-ratio transmission 28 at each particular candidate combination of prime-mover operating speed and transmission drive ratio. Similarly, power-system controls 24 may determine the energy efficiency of hydraulic pump 45 and electric generator 47 by using information about the current operating states of hydraulic pump 45 and electric generator 47 in combination with data about the relationship between the energy efficiency of these components and the operating speed of prime mover 18. Power-system controls 24 may then determine the combined energy-efficiency estimate for each candidate combination of prime-mover operating speed and transmission drive ratio by, for example, determining the aggregate usable power that multiple-ratio transmission 28, hydraulic pump 45, and electric generator 47 would output, and comparing that value to the quantity of fuel that prime mover 18 would consume.

Subsequently, power-system controls 24 may determine a first target for the prime-mover operating speed and the transmission drive ratio based at least in part on the combined energy-efficiency estimates (step 152). For example, power-system controls 24 may select as the first target the candidate combination of prime-mover operating speed and transmission drive ratio having the highest combined energy-efficiency estimate. Thus, the first target for the prime-mover operating speed and transmission drive ratio may include one or more potential operating points where power system 12 could meet the current power demand with high energy efficiency.

Power-system controls 24 may simultaneously determine a second target for the combination of prime-mover operating speed and transmission drive ratio based on factors related to responsiveness of power system 12 to increased power demands (step 154). In other words, power-system controls 24 may select as the second target one or more combinations of prime-mover operating speed and transmission drive ratio at which power system 12 has the ability to increase the amount of power provided sufficiently rapidly to meet ordinary fluctuations in power demands for the circumstances at hand. To do so, power-system controls 24 may, for example, first determine an anticipated range of fluctuation in power demands under the circumstances at hand. Then, power-system controls 24 may identify one or more combinations of prime-mover operating speed and transmission drive ratio at which power system 12 can meet any power demand within the anticipated range. Power-system controls 24 may use various factors to determine an anticipated range of power demands, including, but not limited to, current and prior values of accelerator throttling signal 76 and decelerator throttling signal 78, the travel speed of machine 10, sensed acceleration or deceleration of machine 10, the current operation of various power loads of machine 10 other than the propulsion system, operator inputs related to requested operation of such other power loads, anticipated changes in the operation of such other power loads, and/or the recent history of changes in the operation of such other power loads. Power-system controls 24 may select as the second target the range of prime-mover operating speeds and associated transmission drive ratios within which power system 12 can meet all power demands within the anticipated range.

Referring to FIG. 2B, after determining the first target and the second target for the combination of prime-mover operating speed and transmission drive ratio, power-system controls 24 may determine whether the first target and the second target overlap (step 156) to decide what prime-mover operating speed and transmission drive ratio to implement. If the first target and the second target overlap, power-system controls 24 may implement a prime-mover operating speed and transmission drive ratio falling within both the first target and the second target (step 158). For example, if the first target includes a single combination of prime-mover operating speed and transmission drive ratio that falls within a range of prime-mover operating speeds and associated transmission drive ratios composing the second target, power-system controls 24 may implement the prime-mover operating speed and transmission drive ratio of the first target. In such circumstances, operating in accordance with the first target ensures high energy efficiency, and operating within the second target ensures sufficient responsiveness to increased power demands.

If the first target and the second target for the combination of prime-mover operating speed and transmission drive ratio do not overlap, power-system controls 24 may implement a combination of prime-mover operating speed and transmission drive ratio within the second target (step 160). This may help ensure sufficient responsiveness of power system 12 to anticipated increases in power demands for the circumstances at hand. At the same time, when the first target and the second target do not overlap, power-system controls 24 may still promote relatively high energy efficiency by biasing the prime-mover operating speed and transmission drive ratio toward the first target. For example, where the second target includes a range or multiple discrete possibilities for the prime-mover operating speed and transmission drive ratio, power-system controls 24 may implement that prime-mover operating speed and transmission drive ratio of the second target that comes closest to the first target. After evaluating whether the first target and the second target overlap (step 156) and determining what combination of prime-mover operating speed and transmission drive ratio to implement based on that determination (steps 158, 160), power-system controls 24 may repeat the process, beginning with determining the current power demand based on operator inputs (step 146, FIG. 2A).

Methods that power-system controls 24 may implement in controlling the prime-mover operating speed and transmission drive ratio are not limited to the examples provided above. For instance, power-system controls 24 may evaluate a different group of components than discussed above when determining combined energy-efficiency estimates for different combinations of prime-mover operating speed and transmission drive ratio. Power-system controls 24 may omit one or both of hydraulic pump 45 and electric generator 47 from the combined energy-efficiency estimates, and/or power-system controls 24 may include various other components in the combined energy-efficiency estimates.

Additionally, power-system controls 24 may determine the first target and the second target for the combination of prime-mover operating speed and transmission drive ratio differently than discussed above. For example, power-system controls 24 may identify the first target as a range of prime-mover operating speeds and associated transmission drive ratios. Similarly, for the second target, power-system controls 24 may identify a single combination of prime-mover operating speed and transmission drive ratio.

Furthermore, power-system controls 24 may employ a different approach for balancing the objectives of energy efficiency and responsiveness. For example, power-system controls 24 may use data related to energy efficiency and data related to responsiveness to assign a score for energy efficiency and a score for responsiveness to each candidate combination of prime-mover operating speed and transmission drive ratio. Power-system controls 24 may then use various factors to determine how much relative weighting to assign to the objective of energy efficiency and the objective of responsiveness in any particular circumstances. Based on the resulting weighting and the scores assigned to each combination of prime-mover operating speed and transmission drive ratio, power-system controls 24 could select and implement one of the candidate combinations of prime-mover operating speed and transmission drive ratio.

The disclosed methods for controlling the prime-mover operating speed and transmission drive ratio may provide a number of performance benefits. By taking into account factors related to both energy efficiency and responsiveness, power-system controls 24 may control the prime-mover operating speed and transmission drive ratio in a way that ensures effectively meeting variations in the operator's power demands while maintaining a high average energy efficiency. Additionally, calculating energy efficiency based on the energy-efficiency characteristics of components like multiple-ratio transmission 28, hydraulic pump 45, and electric generator 47, in addition to the energy-efficiency characteristics of prime mover 18, enhances the accuracy of the resulting estimates, thereby enhancing the ability to promote energy efficiency through control decisions based on those estimates.

It will be apparent to those skilled in the art that various modifications and variations can be made in the disclosed power system and control methods without departing from the scope of the disclosure. Other embodiments of the disclosed power system and control methods will be apparent to those skilled in the art from consideration of the specification and practice of the power system and control methods disclosed herein. It is intended that the specification and examples be considered as exemplary only, with a true scope of the disclosure being indicated by the following claims and their equivalents.

What is claimed is:

1. A method of operating a machine having a power system that includes a prime mover, a multiple-ratio transmission, a propulsion device, and power-system controls, the method comprising:
 propelling the machine by transmitting power from the prime mover to the propulsion device through the multiple-ratio transmission, while controlling operation of the prime mover and the multiple-ratio transmission with the power-system controls, including:
  determining with the power-system controls at least one energy-efficiency estimate based at least on energy-efficiency characteristics of the prime mover and energy-efficiency characteristics of the multiple-ratio transmission, wherein determining the at least one energy-efficiency estimate includes determining multiple energy-efficiency estimates associated with alternative combinations of the prime-mover operating speed and the transmission drive ratio, and
  controlling a prime-mover operating speed of the prime mover and a transmission drive ratio of the multiple-ratio transmission based at least on the at least one energy-efficiency estimate, wherein controlling the prime-mover operating speed and the transmission drive ratio includes:
   selecting a combination of the prime-mover operating speed and the transmission drive ratio associated with one of the multiple energy-efficiency estimates as a first target for the prime-mover operating speed and the transmission drive ratio;
   determining a second target for the prime-mover operating speed and the transmission drive ratio, the second target being associated with responsiveness of the power system to increased power demands; and
   controlling the prime-mover operating speed and the transmission drive ratio based at least on the first target and the second target.

2. The method of claim 1, wherein controlling the prime-mover operating speed and the transmission drive ratio based at least on the first target and the second target includes:
 if the first target overlaps with the second target, controlling the prime-mover operating speed and the multiple-ratio transmission to coincide with the first target.

3. The method of claim 1, wherein controlling the prime-mover operating speed and the transmission drive ratio based at least on the first target and the second target includes:
 if the first target deviates from the second target, controlling the prime-mover operating speed and the transmission drive ratio to coincide with the second target.

4. The method of claim 3, wherein:
 the second target is a range of prime-mover operating speeds and associated transmission drive ratios; and
 controlling the prime-mover operating speed and the transmission drive ratio to coincide with the second target includes biasing the prime-mover operating speed and the transmission drive ratio within the range of the second target toward the first target.

5. The method of claim 1, wherein:
 the power system includes one or more power loads operable with power from the prime mover; and
 the at least one energy-efficiency estimate is further based on energy-efficiency characteristics of at least one of the one or more power loads.

6. The method of claim 1, further including:
 determining a power demand value based at least on one or more throttling inputs from an operator of the machine; and
 wherein controlling the prime-mover operating speed and the transmission drive ratio based at least on the at least one energy-efficiency estimate includes controlling the prime-mover operating speed based at least on the power-demand value.

7. A method of operating a machine having a power system that includes a prime mover, a multiple-ratio transmission, a propulsion device, and power-system controls, the method comprising:
 propelling the machine by transmitting power from the prime mover to the propulsion device through the multiple-ratio transmission, while controlling operation of the prime mover and the multiple-ratio transmission with the power-system controls, including:
  determining with the power-system controls at least one energy-efficiency estimate based at least on energy-efficiency characteristics of the prime mover and energy-efficiency characteristics of the multiple-ratio transmission, wherein determining the at least one energy-efficiency estimate includes determining an energy-efficiency estimate for each of a plurality of candidate combinations of prime-mover operating speed and transmission drive ratio capable of meeting an estimated power demand on the power system; and
  controlling a prime-mover operating speed of the prime mover and a transmission drive ratio of the multiple-ratio transmission based at least on the at least one energy-efficiency estimate, wherein controlling the prime-mover operating speed and transmission drive ratio based at least on the at least one energy-efficiency estimate includes selecting from among the candidate combinations of prime-mover operating speed and transmission drive ratio based on the associated energy-efficiency estimates.

8. A machine, comprising:
a power system, including
a prime mover;
a propulsion device;
a multiple-ratio transmission; and
power-system controls that selectively operate the power system to propel the machine by transmitting power from the prime mover to the propulsion device through the multiple-ratio transmission, including:
  determining a first target for a prime-mover operating speed of the prime mover and a transmission drive ratio of the multiple-ratio transmission, the first target being associated with promoting energy efficiency,
  determining a second target for the prime-mover operating speed and the transmission drive ratio, the second target being associated with promoting responsiveness of the power system to increased power demands, and
  controlling the prime-mover operating speed and the transmission drive ratio based at least on both the first target and the second target.

9. The machine of claim 8, wherein determining the first target for the prime-mover operating speed and the transmission drive ratio includes determining an energy-efficiency estimate associated with at least one combination of the prime-mover operating speed and the transmission drive ratio based at least on energy-efficiency characteristics of the multiple-ratio transmission.

10. The machine of claim 8, wherein controlling the prime-mover operating speed and the transmission drive ratio based at least on the first target and the second target includes:
  if the first target overlaps with the second target, controlling the prime-mover operating speed and the transmission drive ratio to coincide with the first target.

11. The machine of claim 10, wherein controlling the prime-mover operating speed and the transmission drive ratio based at least on the first target and the second target further includes:
  if the first target deviates from the second target, controlling the prime-mover operating speed and the transmission drive ratio to coincide with the second target.

12. The machine of claim 11, wherein:
  the second target is a range of prime-mover operating speeds and associated transmission drive ratios; and
  controlling the prime-mover operating speed and the transmission drive ratio to coincide with the second target when the first target deviates from the second target includes biasing the prime-mover operating speed and transmission drive ratio within the range of the second target toward the first target.

13. A machine, comprising:
a power system, including
a prime mover;
a propulsion device;
a multiple-ratio transmission; and
power-system controls that selectively operate the power system to propel the machine by transmitting power from the prime mover to the propulsion device through the multiple-ratio transmission, including
  determining a first target for a combination of a prime-mover operating speed of the prime mover and a transmission drive ratio of the multiple-ratio transmission, including
  determining multiple combined energy-efficiency estimates for a plurality of components of the power system at multiple alternative combinations of the prime-mover operating speed and the transmission drive ratio, and
  selecting the first target based at least in part on the multiple combined energy-efficiency estimates;
  determining a second target for the combination of the prime-mover operating speed and the transmission drive ratio, the second target being associated with promoting responsiveness of the power system to increased power demands; and
  controlling the prime-mover operating speed and the transmission drive ratio based at least on both the first target and the second target.

14. The machine of claim 13, wherein each of the multiple combined energy-efficiency estimates for the plurality of components is based at least on energy-efficiency characteristics of the prime mover and energy-efficiency characteristics of the multiple-ratio transmission.

15. The machine of claim 14, wherein:
  the power system includes one or more additional components operable with power from the prime mover; and
  each of the multiple combined energy-efficiency estimates is further based on energy-efficiency characteristics of at least one of the one or more additional components.

16. The machine of claim 13, wherein selecting the first target based at least on the multiple combined energy-efficiency estimates includes selecting as the first target the combination of the prime-mover operating speed and the transmission drive ratio associated with the highest of the multiple combined energy-efficiency estimates.

17. The machine of claim 13, wherein:
  the second target is a range of prime-mover operating speeds and associated transmission drive ratios; and
  controlling the prime-mover operating speed and the transmission drive ratio based at least on both the first target and the second target includes
  if the first target deviates from the second target, controlling the prime-mover operating speed and the transmission drive ratio to coincide with the second target while biasing the prime-mover operating speed and the transmission drive ratio within the range of the second target toward the first target.

* * * * *